United States Patent
Yamamoto et al.

(10) Patent No.: US 6,532,513 B1
(45) Date of Patent: Mar. 11, 2003

(54) INFORMATION RECORDING AND REPRODUCTION APPARATUS

(75) Inventors: Yoshikazu Yamamoto, Osaka (JP); Hiroyuki Yabuno, Osaka (JP); Kenji Takauchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 48 days.

(21) Appl. No.: 09/714,533

(22) Filed: Nov. 16, 2000

(30) Foreign Application Priority Data

Nov. 16, 1999 (JP) ............................................. 11-325088

(51) Int. Cl.⁷ ............................................. G06F 12/00
(52) U.S. Cl. ........................ 711/100; 711/113; 711/134; 711/170
(58) Field of Search .............................. 711/100, 113, 711/133–136, 170

(56) References Cited

U.S. PATENT DOCUMENTS

| | | | |
|---|---|---|---|
| 4,530,054 A | * 7/1985 | Hamstra et al. ............ 711/133 |
| 5,432,919 A | 7/1995 | Falcone et al. ............. 711/134 |
| 5,966,726 A | 10/1999 | Sokolov ..................... 711/113 |
| 6,094,707 A | * 7/2000 | Sokolov et al. ............. 711/113 |
| 6,182,200 B1 | * 1/2001 | Duvall et al. ............... 711/165 |
| 6,279,076 B1 | * 8/2001 | Shishido et al. ............ 711/113 |

* cited by examiner

*Primary Examiner*—Do Hyun Yoo
*Assistant Examiner*—Nasser Moazzami
(74) *Attorney, Agent, or Firm*—Snell & Wilmer L.L.P.

(57) ABSTRACT

An information recording and reproduction apparatus includes a data transfer controller for receiving data to be written transferred from a host computer; a cache data memory divided into a plurality of segments for temporarily storing the data to be written received by the data transfer controller; a segment connection information memory for storing segment connection information representing a logical connection state of the plurality of segments; a buffer memory controller for managing the data to be written temporarily stored in the cache data memory; and a recording and reproduction controller for writing the data to be written temporarily stored in the cache data memory into a recording medium. The buffer memory controller updates the segment connection information so as to change the logical connection state of the plurality of segments.

33 Claims, 18 Drawing Sheets

FIG.16

| Segment number | | |
|---|---|---|
| | 1 | LBA=0, 32Blocks |
| | 2 | LBA=200, 16Blocks |
| | 3 | LBA=32, 32Blocks |
| | 4 | LBA=500, 16Blocks |
| | 5 | LBA=64, 16Blocks |
| | 6 | |

102

Connection state of segments

Segment repetition time

INFORMATION RECORDING AND REPRODUCTION APPARATUS

BACKGROUND OF THE INVENTION

1. Field of the Invention

The present invention relates to an information recording and reproduction apparatus for improving the speed of data recording and reproduction by temporarily storing data to be transferred between a host computer and a recording medium in a cache memory.

2. Description of the Related Art

An information recording and reproduction apparatus used as an external memory apparatus of a host computer, such as an optical disk apparatus, reads data from and writes data into a recording medium at a lower speed than a speed of data transfer between the information recording and reproduction apparatus and the host computer. In order to improve the speed of recording and reproduction, it has recently become common to provide a cache memory for temporarily storing data in the information recording and reproduction apparatus so that data is transferred through the cache memory.

The information recording and reproduction apparatus having such a cache memory performs as follows.

When a data read operation is requested from the host computer, the information recording and reproduction apparatus reads the requested data from the recording medium and also reads data which is expected to be requested (a so-called "read-ahead" system).

When a data write operation is requested from the host computer, the information recording and reproduction apparatus notifies the host computer of the completion of the data write operation when the data to be written is stored in the cache memory and then writes the stored data into the recording medium (a so-called "write-back" system).

Such an information recording and reproduction apparatus generally uses a ring buffer system of using the cache memory in repetition. Accordingly, an effect of the cache memory is provided for reading data from or writing data into a single continuous area of the recording medium, but a sufficient effect of the cache memory cannot be provided when accesses to a plurality of discrete areas of the recording medium a re required.

In order to solve this problem, a system of dividing the cache memory into a plurality of ring buffers has been proposed. When a plurality of, for example, two, ring buffers are used, a sufficient effect of the cache memory can be provided to improve the processing speed even when accesses to more than one, in this case, two discrete areas of the recording medium are required.

However, this system of dividing the cache memory into a plurality of ring buffers has the following problem. When the number of the ring buffers is smaller than the number of the discrete areas of the recording medium to be accessed, all of the discrete areas cannot correspond to the ring buffers. As a result, the effect of the cache memory is reduced. When the number of the ring buffers is larger than the number of the discrete areas of the recording medium to be accessed, all the ring buffers are not used. As a result, the cache memory cannot be used efficiently. In other words, a sufficient effect of the cache memory cannot be provided depending on the number of the ring buffers, the size of each of the ring buffers, and the access pattern from the host computer (i.e., access to a single continuous area or access to a plurality of discrete areas).

SUMMARY OF THE INVENTION

According to an information recording and reproduction apparatus includes a data transfer controller for receiving data to be written transferred from a host computer; a cache data memory divided into a plurality of segments for temporarily storing the data to be written received by the data transfer controller; a segment connection information memory for storing segment connection information representing a logical connection state of the plurality of segments; a buffer memory controller for managing the data to be written temporarily stored in the cache data memory; and a recording and reproduction controller for writing the data to be written temporarily stored in the cache data memory into a recording medium. The buffer memory controller updates the segment connection information so as to change the logical connection state of the plurality of segments.

In one embodiment of the invention, the buffer memory controller changes a used segment among the plurality of segments into an unused segment so as to obtain a sufficient number of unused segments in order to process the data to be written, and updates the segment connection information so as to logically connect the unused segments.

In one embodiment of the invention, the buffer memory controller updates the segment connection information so as to logically connect the plurality of segments storing the data to be written, where the data is from sequential logical block addresses.

In one embodiment of the invention, the recording and reproduction controller sequentially writes the data to be written which is stored in the logically connected plurality of segments and is from sequential logical block addresses into the recording medium.

In one embodiment of the invention, the segment connection information memory stores the segment connection information as a unidirectional list.

In one embodiment of the invention, the segment connection information memory stores the segment connection information as a bidirectional list.

In one embodiment of the invention, the information recording and reproduction further includes a cache management information memory for storing management information on the data to be written temporarily stored in the cache data memory on a segment-by-segment basis of the plurality of segments.

In one embodiment of the invention, the management information includes an effective data flag which is set when effective data is stored in a segment of the plurality of segments, and a dirty flag which is set when unwritten data which has not been written into the recording medium is stored in the segment.

In one embodiment of the invention, at least two of the cache data memory, the segment connection information memory and the cache management information memory are structured as one memory.

According to another aspect of the invention, an information recording and reproduction apparatus includes a data transfer controller for receiving a data read request transferred from a host computer; a recording and reproduction controller for reading data to be read from the recording medium as requested by the host computer; a cache data memory divided into a plurality of segments for temporarily storing the data to be read which has been read by the recording and reproduction controller: a segment connection information memory for storing segment connection information representing a logical connection state of the plurality of segments; and a buffer memory controller for managing the data to be read temporarily stored in the cache data memory. The data transfer controller transfers the data to be read temporarily stored in the cache data memory to the host computer. The buffer memory controller updates the segment connection information so as to change the logical connection state of the plurality of segments.

In one embodiment of the invention, the buffer memory controller changes a used segment among the plurality of segments into an unused segment so as to obtain a sufficient number of unused segments to process the data to be read, and updates the segment connection information so as to logically connect the unused segments.

In one embodiment of the invention, the segment connection information memory stores the segment connection information as a unidirectional list.

In one embodiment of the invention, the segment connection information memory stores the segment connection information as a bidirectional list.

In one embodiment of the invention, the information recording and reproduction apparatus further includes a cache management information memory for storing management information on the data to be read temporarily stored in the cache data memory on a segment-by-segment basis of the plurality of segments.

In one embodiment of the invention, the management information includes an effective data flag which is set when effective data is stored in a segment of the plurality of segments, and a dirty flag which is set when unwritten data which has not been written into the recording medium is stored in the segment.

In one embodiment of the invention, at least two of the cache data memory, the segment connection information memory and the cache management information memory are structured as one memory.

According to still another aspect of the invention, an information recording and reproduction apparatus includes a data transfer controller for receiving data to be written transferred from a host computer; a cache data memory divided into a plurality of segments for temporarily storing the data to be written which has been received by the data transfer controller; a segment division information memory storing segment division information representing a division state of at least one of the plurality of segments; a segment connection information memory for storing segment connection information representing a logical connection state of the plurality of segments; a buffer memory controller for managing the data to be written temporarily stored in the cache data memory; and a recording and reproduction controller for writing data to be written temporarily stored in the cache data memory into a recording medium. The buffer memory controller updates the segment division information and the segment connection information so as to change the division state of the at least one of the plurality of segments and the logical connection state of the plurality of segments, respectively.

In one embodiment of the invention, the buffer memory controller divides an unused segment among the plurality of segments into a first unused segment having a sufficient size to process the data to be written and a second unused segment.

In one embodiment of the invention, the buffer memory controller updates the segment connection information so as to logically connect the plurality of segments storing the data to be written, where the data is from sequential logical block addresses.

In one embodiment of the invention, the recording and reproduction controller sequentially writes the data to be written which is stored in the logically connected plurality of segments and is from sequential logical block addresses into the recording medium.

In one embodiment of the invention, the segment connection information memory stores the segment connection information as a unidirectional list.

In one embodiment of the invention, the segment connection information memory stores the segment connection information as a bidirectional list.

In one embodiment of the invention, the information recording and reproduction apparatus further includes a cache management information memory for storing management information on the data to be written temporarily stored in the cache data memory on a segment-by-segment basis of the plurality of segments.

In one embodiment of the invention, the management information includes an effective data flag which is set when effective data is stored in a segment of the plurality of segments, and a dirty flag which is set when unwritten data which has not been written into the recording medium is stored in the segment.

In one embodiment of the invention, at least two of the cache data memory, the segment division information memory, the segment connection information memory and the cache management information memory are structured as one memory.

According to still another aspect of the invention, an information recording and reproduction apparatus includes a data transfer controller for receiving a data read request transferred from a host computer; a recording and reproduction controller for reading data to be read from the recording medium as requested by the host computer; a cache data memory divided into a plurality of segments for temporarily storing the data to be read which has been read by the recording and reproduction controller; a segment division information memory storing segment division information representing a division state of at least one of the plurality of segments; a segment connection information memory for storing segment connection information representing a logical connection state of the plurality of segments; and a buffer memory controller for managing the data to be read temporarily stored in the cache data memory. The data transfer controller transfers the data to be read temporarily stored in the cache data memory to the host computer. The buffer memory controller updates the segment division information and the segment connection information so as to change the division state of the at least one of the plurality of segments and the logical connection state of the plurality of segments, respectively.

In one embodiment of the invention, the buffer memory controller divides an unused segment among the plurality of segments into a first unused segment having a sufficient size to process the data to be read and a second unused segment.

In one embodiment of the invention, the segment connection information memory stores the segment connection information as a unidirectional list.

In one embodiment of the invention, the segment connection information memory stores the segment connection information as a bidirectional list.

In one embodiment of the invention, the information recording and reproduction apparatus further includes a cache management information memory for storing management information on the data to be read temporarily stored in the cache data memory on a segment-by-segment basis of the plurality of segments.

In one embodiment of the invention, the management information includes an effective data flag which is set when effective data is stored in a segment of the plurality of segments, and a dirty flag which is set when unwritten data which has not been written into the recording medium is stored in the segment.

In one embodiment of the invention, at least two of the cache data memory, the segment division information memory, the segment connection information memory and the cache management information memory are structured as one memory.

According to still another aspect of the invention, an information recording and reproduction apparatus includes a data transfer controller for receiving data to be written transferred from a host computer; a cache data memory divided into a plurality of segments for temporarily storing the data to be written received by the data transfer controller; a segment connection information memory for storing segment connection information representing a logical connection state of the plurality of segments; a buffer memory controller for managing the data to be written temporarily stored in the cache data memory; and a recording and reproduction controller for recording the data to be written temporarily stored in the cache data memory into a recording medium. The buffer memory controller updates the segment connection information so as to change the logical connection state of the plurality of segments. The data to be written includes a first data which is repeated a prescribed number of times within the data to be written. The recording and reproduction controller writes the data to be written temporarily stored in the cache data memory into the recording medium based on repetition time information representing the prescribed number of times and the segment connection information.

In one embodiment of the invention, the repetition time information is stored in the segment connection information memory.

In one embodiment of the invention, the cache data memory stores the first data.

An information recording and reproduction apparatus according to the present invention includes a segment connection information memory for storing segment connection information and thus can logically change the connection state of the segments in a cache data memory.

Thus, the invention described herein makes possible the advantage of providing an information recording and reproduction apparatus for utilizing a cache memory to a maximum level regardless of an access pattern from a host computer.

These and other advantages of the present invention will become apparent to those skilled in the art upon reading and understanding the following detailed description with reference to the accompanying figures.

BRIEF DESCRIPTION OF THE DRAWINGS

FIG. 16 is a diagram illustrating an example of segment connection performed during write processing of the information recording and reproduction apparatus shown in FIG. 11 according to the second example;

DESCRIPTION OF THE PREFERRED EMBODIMENTS

An information recording and reproduction apparatus according to the present invention allows a cache data memory to be divided into a plurality of segments and also allows a connection state of the segments to be changed freely and dynamically. Accordingly, it is possible to provide a plurality of ring buffers, add one or more segments to the ring buffers to increase a size thereof, or delete one or more segments from the ring buffers to decrease a size thereof.

Hereinafter, the present invention will be described by way of illustrative examples with reference to the accompanying drawings.

EXAMPLE 1

Figure 1:
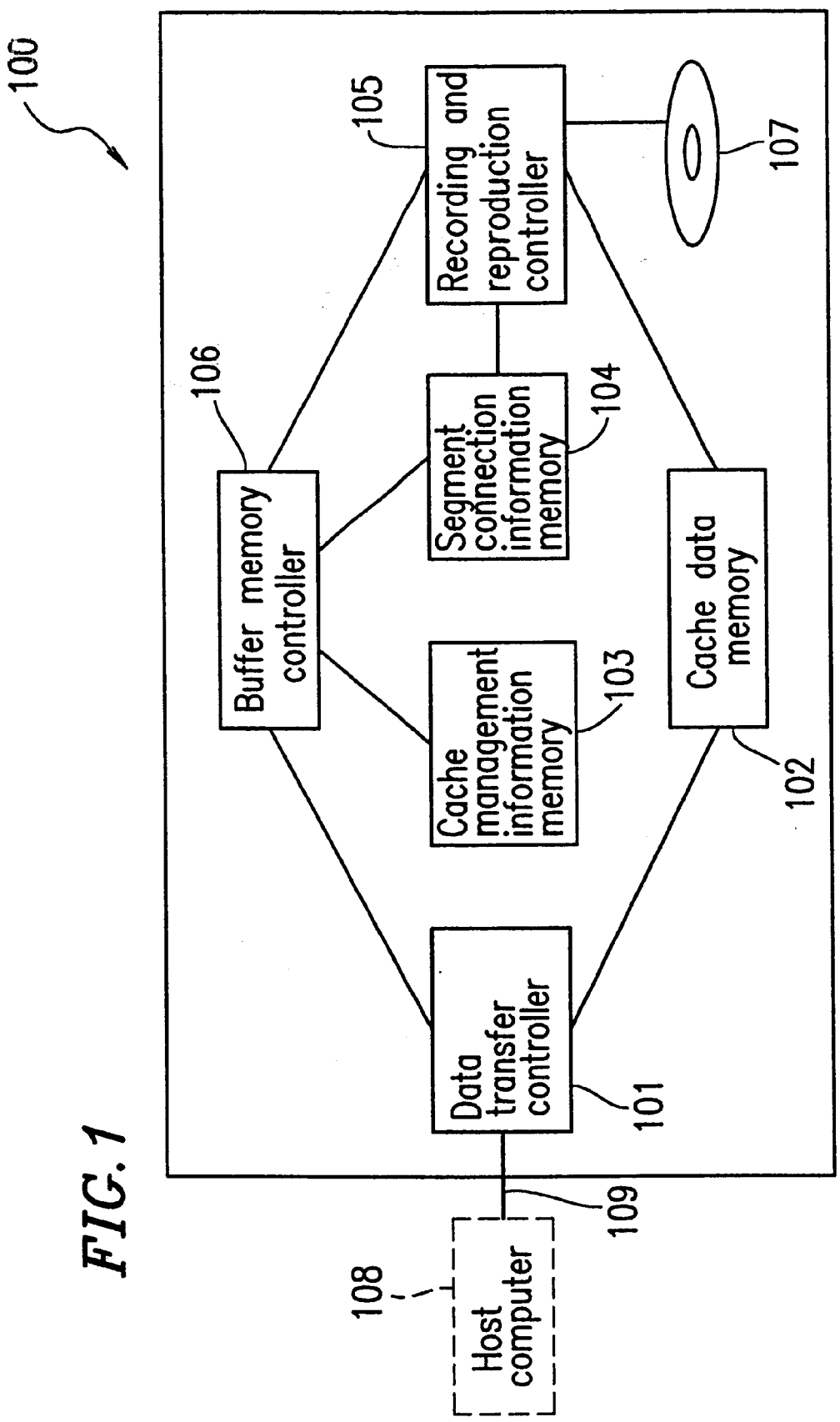
FIG. 1 is a block diagram illustrating an information recording and reproduction apparatus according to a first example of the present invention.

FIG. 1 is a block diagram illustrating a structure of an information recording and reproduction apparatus 100 according to a first example of the present invention.

The information recording and reproduction apparatus 100 includes a data transfer controller 101, a cache data memory 102, a cache management information memory 103, a segment connection information memory 104, a recording and reproduction controller 105, and a buffer memory controller 106.

The data transfer controller 101 is connected to a host computer 108 via an interface cable 109, and performs protocol control of command transmission and data transmission performed by, for example, a SCSI or ATA (ATAPI).

The cache data memory 102 temporarily stores data to be written into a recording medium 107 or data read from the recording medium 107. The cache data memory 102 can be divided into a plurality of segments.

Figure 2:
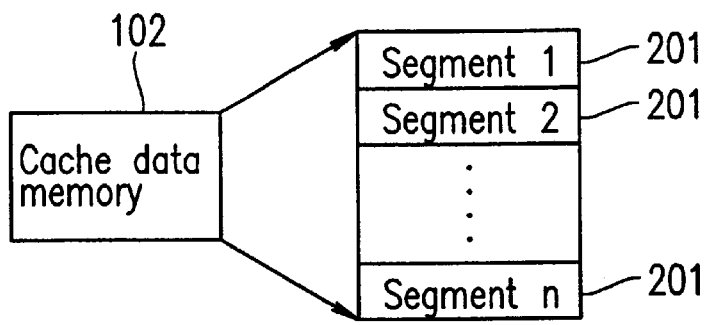
FIG. 2 is a diagram illustrating an exemplary structure of a cache data memory shown in FIG. 1.

FIG. 2 shows an exemplary structure of the cache data memory 102, which includes n segments 201 (segments having segment numbers 1 through n; hereinafter referred to as segment 1 through segment n).

Figure 3:
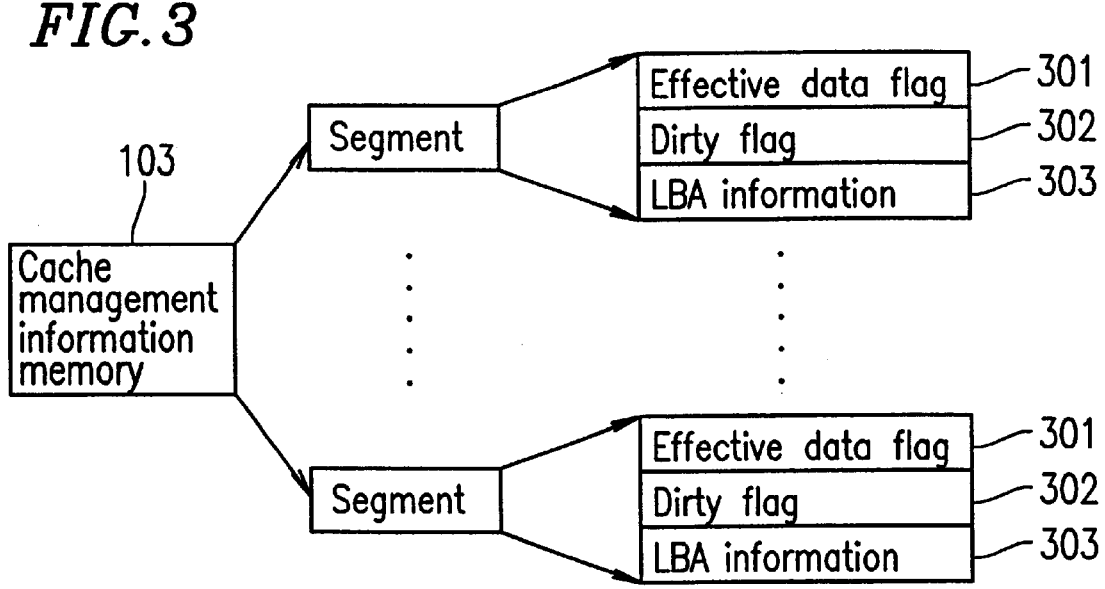
FIG. 3 is a diagram illustrating an exemplary structure of a cache management information memory shown in FIG. 1.

Returning to FIG. 1, the cache management information memory 103 stores information regarding the data stored in the segments 201 on a segment-by-segment basis as shown in FIG. 3. In the cache management information memory 103, an effective data flag 301, a dirty flag 302, and logical block address (LBA) information 303 for each segment are stored. The effective data flag 301 is set in the case where effective data is present in the respective segment. The dirty flag 302 is set in the case where unwritten data which has not been written into the recording medium 107 (FIG. 1) is present in the respective segment. The LBA information 303 represents the LBA in the recording medium 107 at which data corresponding to the respective segment is stored.

Figure 4:
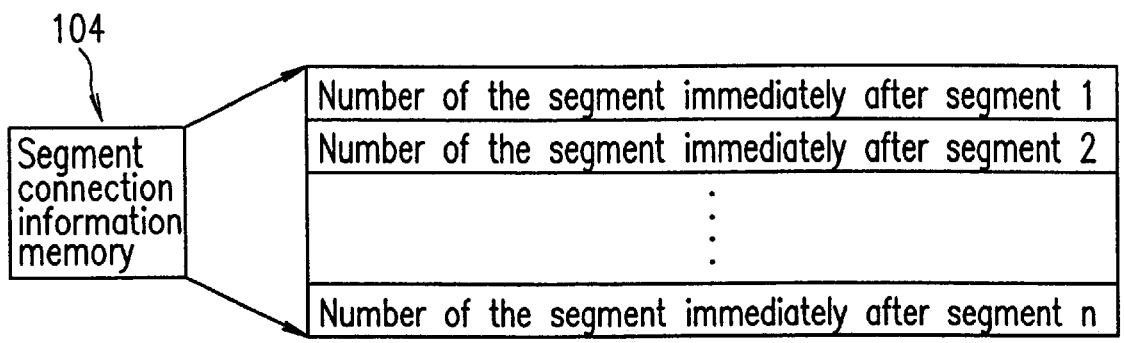
FIG. 4 is a diagram illustrating an exemplary structure of a segment connection information memory shown in FIG. 1 according to the first example when a unidirectional list is included.
Figure 5:
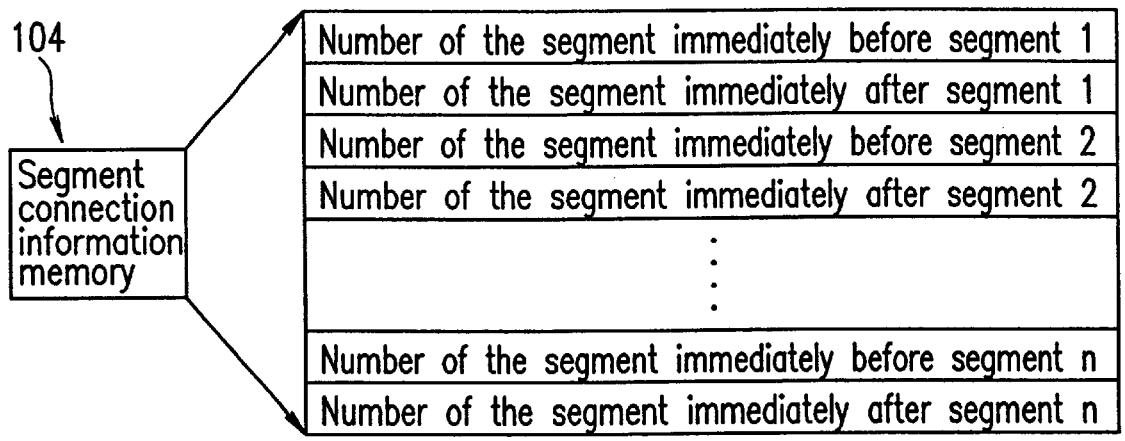
FIG. 5 is a diagram illustrating an exemplary structure of the segment connection information memory shown in FIG. 1 according to the first example when a bidirectional list is included.

The segment connection information memory 104 stores segment connection information of the segments 201 in the cache data memory 102. The segment connection information memory 104 includes, for example, a unidirectional list or a bidirectional list. FIG. 4 shows an exemplary structure of the segment connection information memory 104 when including the unidirectional list. In this case, there is an advantage that the size of an area required for storing the segment connection information of the segments 201 can be reduced. FIG. 5 shows an exemplary structure of the segment connection information memory 104 when including the bidirectional list. In this case, there is an advantage that processing for changing the connection of the segments 201, specifically processing for deleting a specified segment, is facilitated.

Figure 6:
FIG. 6 is a diagram illustrating an exemplary operation of the information recording and reproduction apparatus shown in FIG. 1 for updating segment connection information so as to delete a specified segment in the first example.

FIG. 6 shows an exemplary operation for updating the segment connection information to delete a specified segment. In this example, the segment connection information memory 104 includes a bidirectional list. Segment 1, segment 5, segment 2, segment 4, and segment 3 are connected in this order to form a ring buffer. From this ring buffer, segment 5 is deleted.

The number of the segment immediately before segment 5 is referred to, thereby obtaining the number 1. The number of the segment immediately after segment 1 is changed from 5 to 2. The number of the segment immediately after segment 5 is referred to, thereby obtaining the number 2. The number of the segment immediately before segment 2 is changed from 5 to 1. Thus, segment 5 is deleted from the ring buffer. As a result, the ring buffer includes segment 1, segment 2, segment 4 and segment 3 connected in this order.

Here, the segment immediately before segment n is represented as Prev(n) and the segment immediately after segment n is represented as Next(n). Using these representations, the process of deleting segment p is generally expressed as storing Next(p) in Next(Prev(p)) and storing Prev(p) in Prev(Next(p)). The process of inserting segment q immediately after segment p is generally expressed as storing Next(p) in Next(q), storing p in Prev(q), and storing q in Next(p). Here, n, p and q are all natural numbers.

Returning to FIG. 1, the recording and reproduction controller 105 stores data read from the recording medium 107 in the cache data memory 102 or writes data stored in the cache data memory 102 into the recording medium 107.

The buffer memory controller 106 includes, for example, a central processing unit and manages cache data.

Figure 7:
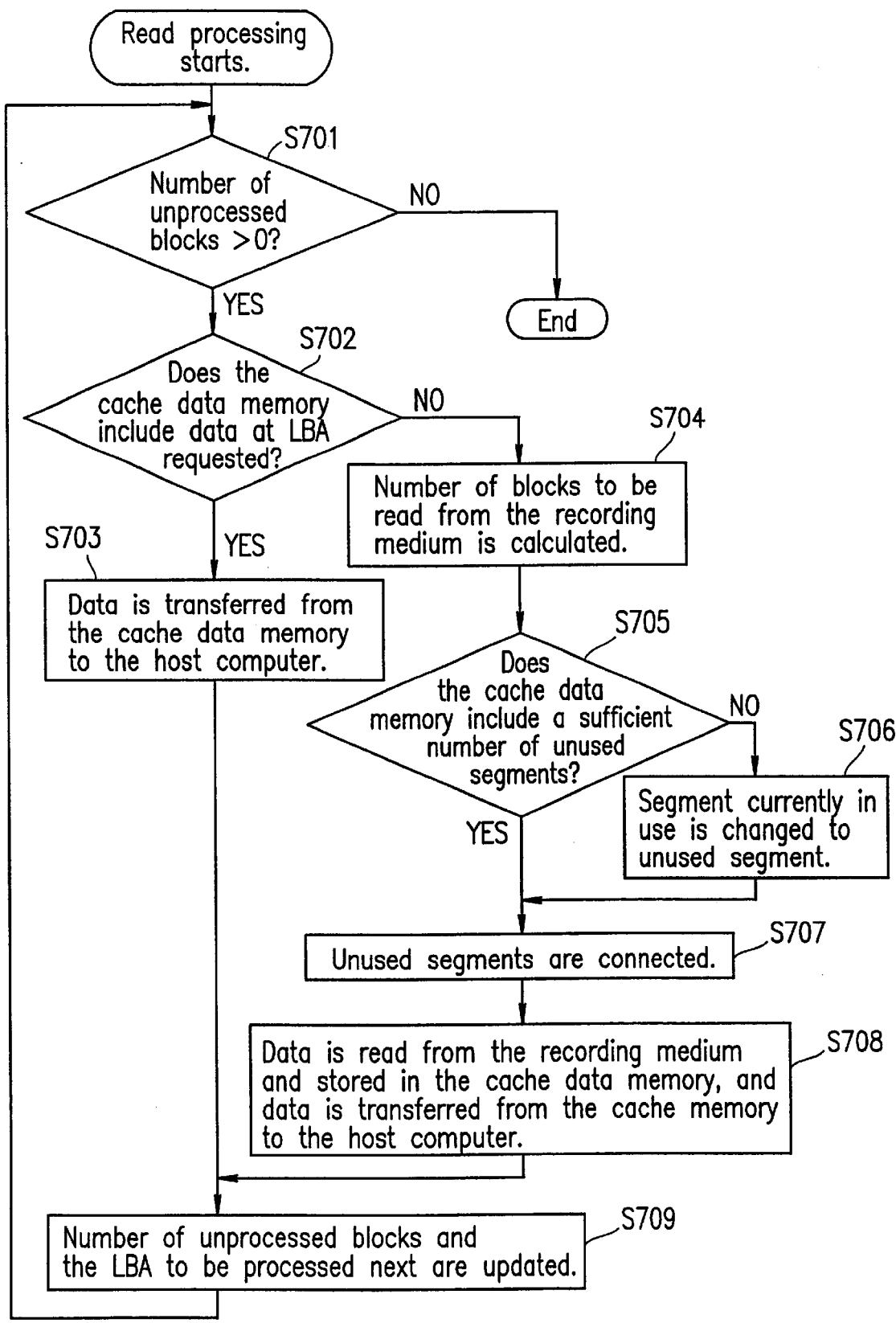
FIG. 7 is a flowchart illustrating read processing performed by the information recording and reproduction apparatus shown in FIG. 1 according to the first example.

FIG. 7 is a flowchart illustrating read processing performed by the information recording and reproduction apparatus 100 according to the first example of the present invention. Processing performed when a data read operation is requested from the host computer 108 (FIG. 1) will be described with reference to FIG. 7. The following processing is performed by the buffer memory controller 106 unless otherwise specified.

In step S701, in response to the data read request from the host computer 108, it is determined whether or not there is at least one unprocessed block. When it is determined that there is at least one unprocessed block, the processing advances to step S702. When it is determined that there is no unprocessed block, the read processing is terminated.

In step S702, it is determined whether or not the cache data memory 102 includes data at the LBA requested by the host computer 108. When it is determined that the cache data memory 102 includes this data, the processing advances to step S703, where this data in the cache data memory 102 is transferred to the host computer 108 by the data transfer controller 101, after which the processing advances to step S709.

When it is determined that the cache data memory 102 does not include the data at the LBA requested by the host computer 108, the processing advances to step S704, where the number of blocks to be read from the recording medium 107 is calculated. The number of blocks to be read is the sum of the number of blocks requested by the host computer 108 and the number of blocks to be read ahead. When the number of blocks to be read is calculated, the processing advances to step S705.

In step S705, it is determined whether or not the cache data memory 102 includes a sufficient number of unused segments 201 to process the number of blocks to be read as calculated in step S704. This determination is performed by referring to the effective data flag 301 stored in the cache management information memory 103 on a segment-bysegment basis. A segment 201 in which the effective data flag 301 is not set is an unused segment.

When it is determined that the cache data memory 102 does not include the sufficient number of unused segments 201 in step S705, the processing advances to step S706, where a segment which is currently in use is changed to an unused segment, thereby obtaining the sufficient number of unused segments. The segment to be changed to an unused segment is selected as follows. For example, a segment in which the effective data flag 301 can be set earlier than others is selected. Alternatively, among segments in which the dirty flags 302 are not set, a segment having a smaller segment number than the others can be selected. When the segment to be changed to an unused segment is determined, the cache management information, in the cache management information memory 103, corresponding to the determined segment is referred to. When the dirty flag 302 is not set in the determined segment, the effective data flag 301 is reset, thus changing the determined segment to an unused segment. When the dirty flag 302 is set in the determined segment, the data in the determined segment is written into the recording medium 107, and the dirty flag 302 and the effective data flag 301 are reset, thus changing the determined segment into an unused segment. In the above description, one segment currently in use is changed to an unused segment, but a plurality of segments currently in use can be changed to unused segments in the same manner.

When it is determined that the cache data memory 102 includes the sufficient number of unused segments in step S705 or when the sufficient number of unused segments are obtained in step S706, the processing advances to step S707, where the segment connection information in the segment connection information memory 104 is updated, thereby logically connecting the unused segments. Then, the processing advances to step S708.

In step S708, the recording and reproduction controller 105 is used to read data from the recording medium 107 and store the data in the unused segments connected in step S707. In addition, the cache management information, in the cache management information memory 103, corresponding to each of these segments is updated. In more detail, regarding each segment, the effective data flag 301 is set in the cache management information, and the LBA of the recording medium 107 from which the data has been read is stored in the LBA information 303. In the case where the data read from the recording medium 107 is data from the LBA requested by the host computer 108, that data is transferred to the host computer 108 by the data transfer controller 101.

After step S703 or S708, the processing advances to step S709, where the number of the unprocessed blocks and the LBA to be processed next are updated. Then, the processing returns to step S701. This sequence of processing steps is repeated until the number of unprocessed blocks becomes zero, upon which the read processing is terminated. Then, the information recording and reproduction apparatus 100 notifies the host computer 108 of the completion of the read processing.

Figure 8:
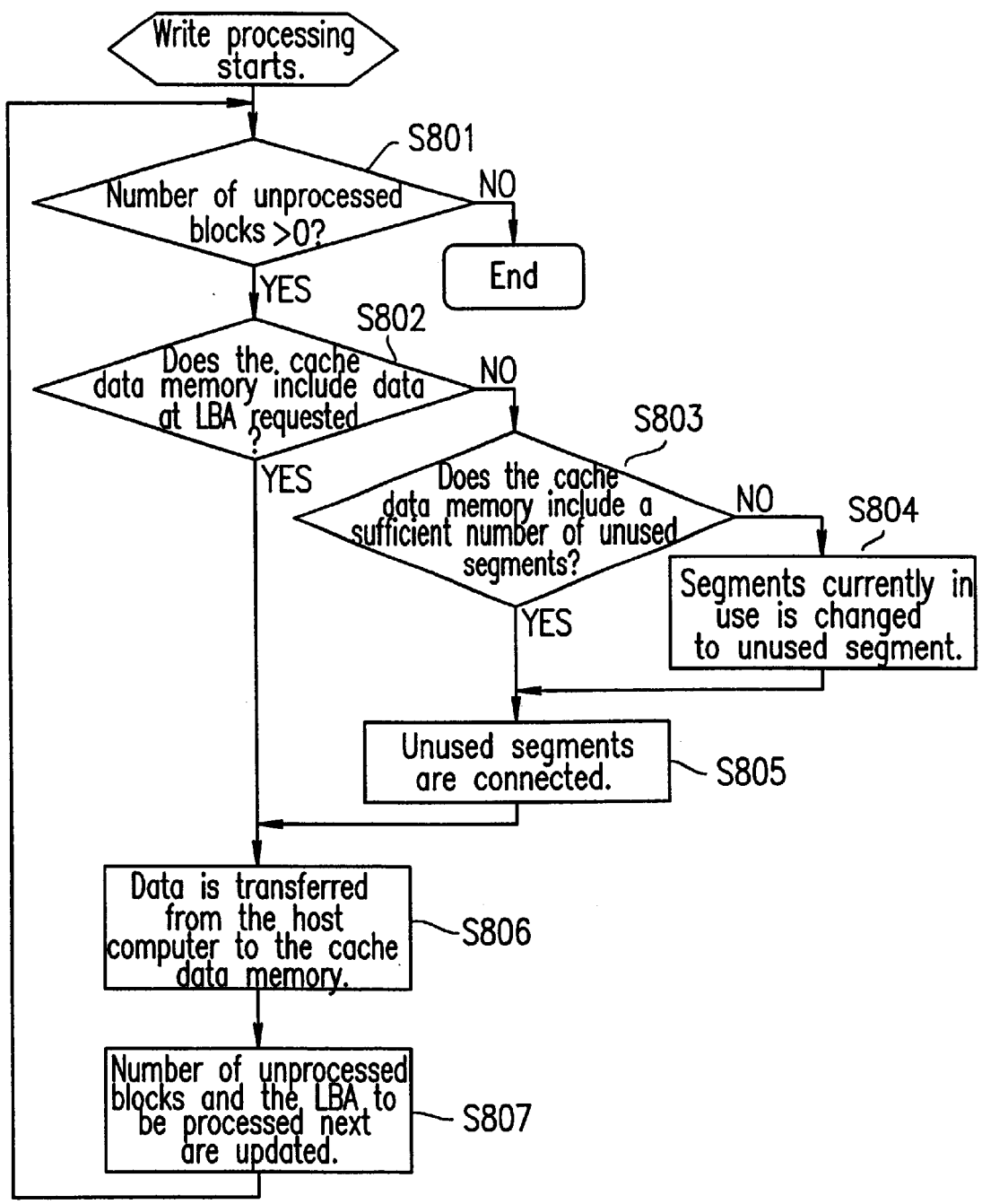
FIG. 8 is a flowchart illustrating write processing performed by the information recording and reproduction apparatus shown in FIG. 1 according to the first example.

Next, processing performed when a data write operation is requested from the host computer 108 will be described with reference to FIG. 8. FIG. 8 is a flowchart illustrating write processing performed by the information recording and reproduction apparatus 100. The following processing is performed by the buffer memory controller 106 unless otherwise specified.

In step S801, in response to the data write request from the host computer 108, it is determined whether or not there is at least one unprocessed block. When it is determined that there is at least one unprocessed block, the processing advances to step S802. When it is determined that there is no unprocessed block, the write processing is terminated.

In step S802, it is determined whether or not the cache data memory 102 includes data at the LBA requested by the host computer 108. When it is determined that the cache data memory 102 includes this data, the processing advances to step S806.

When it is determined that the cache data memory 102 does not include the data at the LBA requested by the host computer 108, the processing advances to step S803, where it is determined whether the cache data memory 102 includes a sufficient number of unused segments 201 to process the number of blocks of data requested by the host computer 108. This determination is performed in a similar manner to the manner used in step S705 in FIG. 7.

When it is determined that the cache data memory 102 does not include the sufficient number of unused segments 201 in step S803, the processing advances to step S804, where a segment which is currently in use is changed to an unused segment, thereby obtaining the sufficient number of unused segments. This processing is performed in a similar manner to the manner used in step S706 in FIG. 7.

When it is determined that the cache data memory 102 includes the sufficient number of unused segments in step S803 or when the sufficient number of unused segments are obtained in step S804, the processing advances to step S805, where the segment connection information in the segment connection information memory 104 is updated, thereby logically connecting the unused segments. Then, the processing advances to step S806.

In step S806, the data is transferred from the host computer 108 to the cache data memory 102 by the data transfer controller 101. In the case where it is determined that the data at the LBA requested by the host computer 108 is stored in the cache data memory 102 (YES in step S802), the data is transferred from the host computer 108 to the segment, in the cache data memory 102, in which this data is stored. In the case where it is determined that the data at the LBA requested by the host computer 108 is not stored in the cache data memory 102 (NO in step S802), the data is transferred from the host computer 108 to one of the segments, in the cache data memory 102, connected in step S805. When the data transfer from the host computer 108 to the cache data memory 102 is completed, the cache management information in the cache management information memory 103is updated. In more detail, regarding each of the segments, the effective data flag 301 and the dirty flag 302 are set, and the LBA requested by and transferred from the host computer 108 is stored in the LBA information 303. Then, the processing advances to step S807.

In step S807, the number of the unprocessed blocks and the LBA to be processed next are updated. Then, the processing returns to step S801. This sequence of processing steps is repeated until the number of unprocessed blocks becomes zero, upon which the write processing is terminated. Then, the data transfer controller 101 notifies the host computer 108 of the completion of the write processing. During free time periods after the notification is done, data which has been transferred to the cache data memory 102, but has not been written into the recording medium 107, i.e., data in the segment 201 in which the dirty flag 302 is set is written into the recording medium 107 by the recording and reproduction controller 105.

Figure 9:
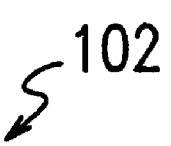
FIG. 9 is a diagram illustrating an exemplary structure of the cache data memory during write processing of the information recording and reproduction apparatus shown in FIG. 1 according to the first example.

With reference to FIG. 9, a practical example of the write processing performed by the information recording and reproduction apparatus 100 according to the first example will be described. In this example, the cache data memory 102 is divided into 8 segments, and each of the 8 segments has a size for holding 16 blocks of data.

When five write requests (32 blocks of data from LBA=0, 16blocks of data from LBA=200, 32 blocks of data from LBA=32, 16 blocks of data from LBA=500, and 16 blocks of data from LBA=64) are received from the host computer 108, the data requested to be written from the host computer 108 is stored in the cache data memory 102 as shown in FIG. 9.

Figure 10:
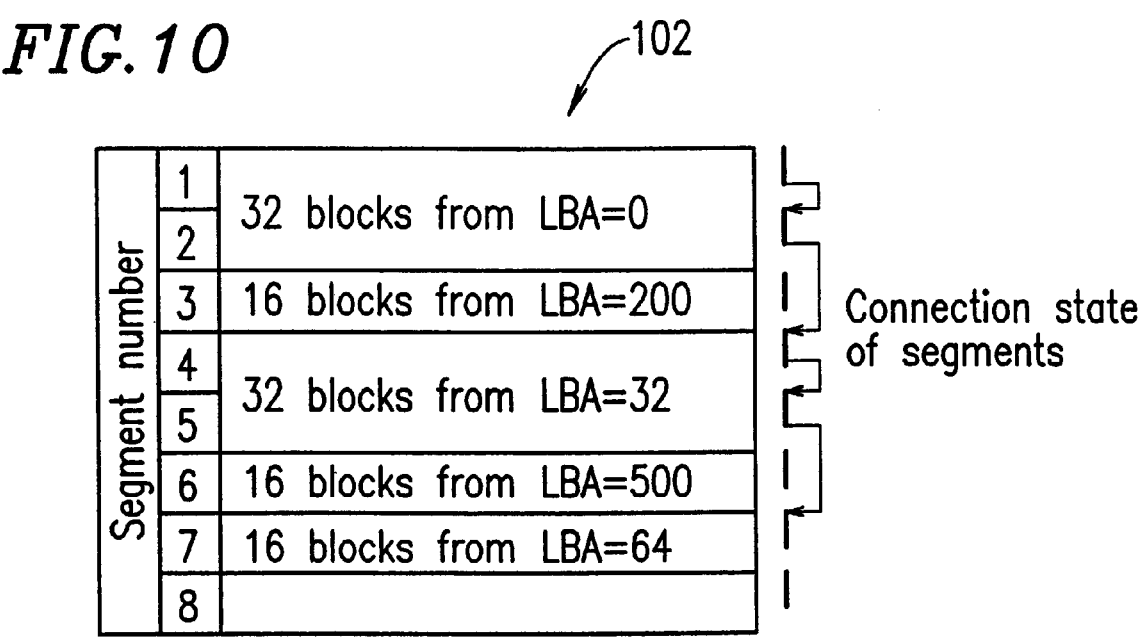
FIG. 10 is a diagram illustrating an example of segment connection performed during write processing of the information recording and reproduction apparatus shown in FIG. 1 according to the first example.

Then, as shown in FIG. 10, the segment connection information in the segment connection information memory 104 is updated. Specifically, 32 blocks of data from LBA=0 which are stored in segment 1 and segment 2, 32 blocks of data from LBA=32 which are stored in segment 4 and segment 5, and 16 blocks of data from LBA=64 which are stored in segment 7 are connected together into 80 (32+32+16) blocks of data from LBA=0. The recording and reproduction controller 105 sequentially writes the 80 blocks of data from LBA=0 into the recording medium 107. The recordingand reproduction controller 105 also writes 16 blocks of data from LBA=200 which are stored in segment 3 and 16 blocks of data from LBA=500 which are stored in segment 6 into the recording medium 107.

Even in the case where the data from the sequential LBAs is divided into a plurality of portions and transferred from the host computer 108 in that divided state as described above, the transferred data is stored in unused segments and the connection state of the segments is dynamically changed to logically connect the data from the sequential LBAs. Thus, the cache data memory 102 can be utilized to a maximum level.

In the first example, the cache data memory 102, the cache management information memory 103 and the segment connection information memory 104 are separate memories. However, the present invention is not limited to this. At least two of the cache data memory 102, the cache management information memory 103 and the segment connection information memory 104 can be structured as one memory.

EXAMPLE 2

Figure 11:
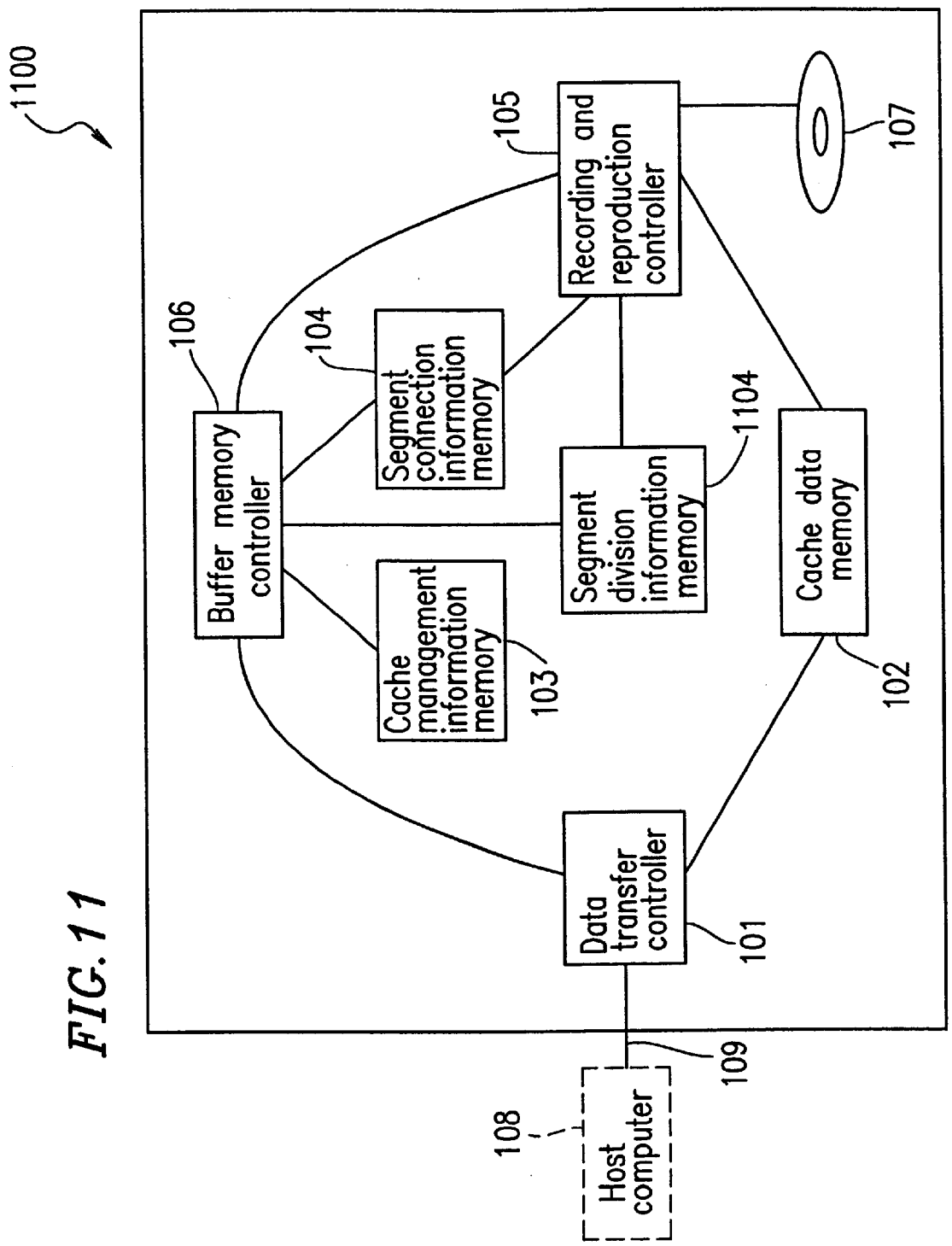
FIG. 11 is a block diagram illustrating an information recording and reproduction apparatus according to a second example of the present invention.

FIG. 11 is a block diagram illustrating a structure of an information recording and reproduction apparatus 1100 according to a second example of the present invention.

The information recording and reproduction apparatus 1100 includes a segment division information memory 1104 in addition to the elements included in the information recording and reproduction apparatus 100 (FIG. 1), i.e., a data transfer controller 101, a cache data memory 102, a cache management information memory 103, a segment connection information memory 104, a recording and reproduction controller 105, and a buffer memory controller 106. Identical elements previously discussed with respect to FIG. 1 bear identical reference numerals and the descriptions thereof will be omitted.

The cache data memory 102 temporarily stores data to be written into a recording medium 107 or data read from the recording medium 107. The cache data memory 102 can be divided into a plurality of segments having different sizes from one another.

Figure 12:
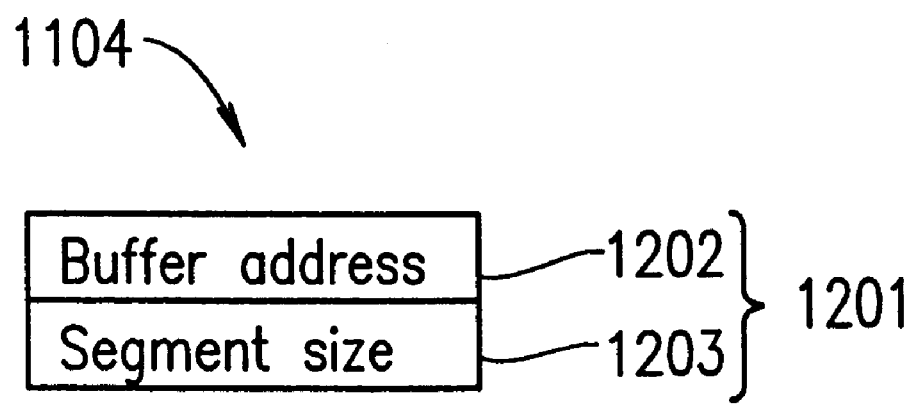
FIG. 12 is an exemplary structure of a segment division information memory shown in FIG. 11.

FIG. 12 shows segment division information 1201 in the segment division information memory 1104. In the segment division information memory 1104, the segment division information 1201 for each of the segments of the cache data memory 102 is stored. The segment division information 1201 indicates a division state of each segment. The segment division information 1201 includes a buffer address 1202 and a segment size 1203. The division state dynamically changes based on a read request and a write request from the host computer 108 by a buffer memory controller 106.

Figure 13:
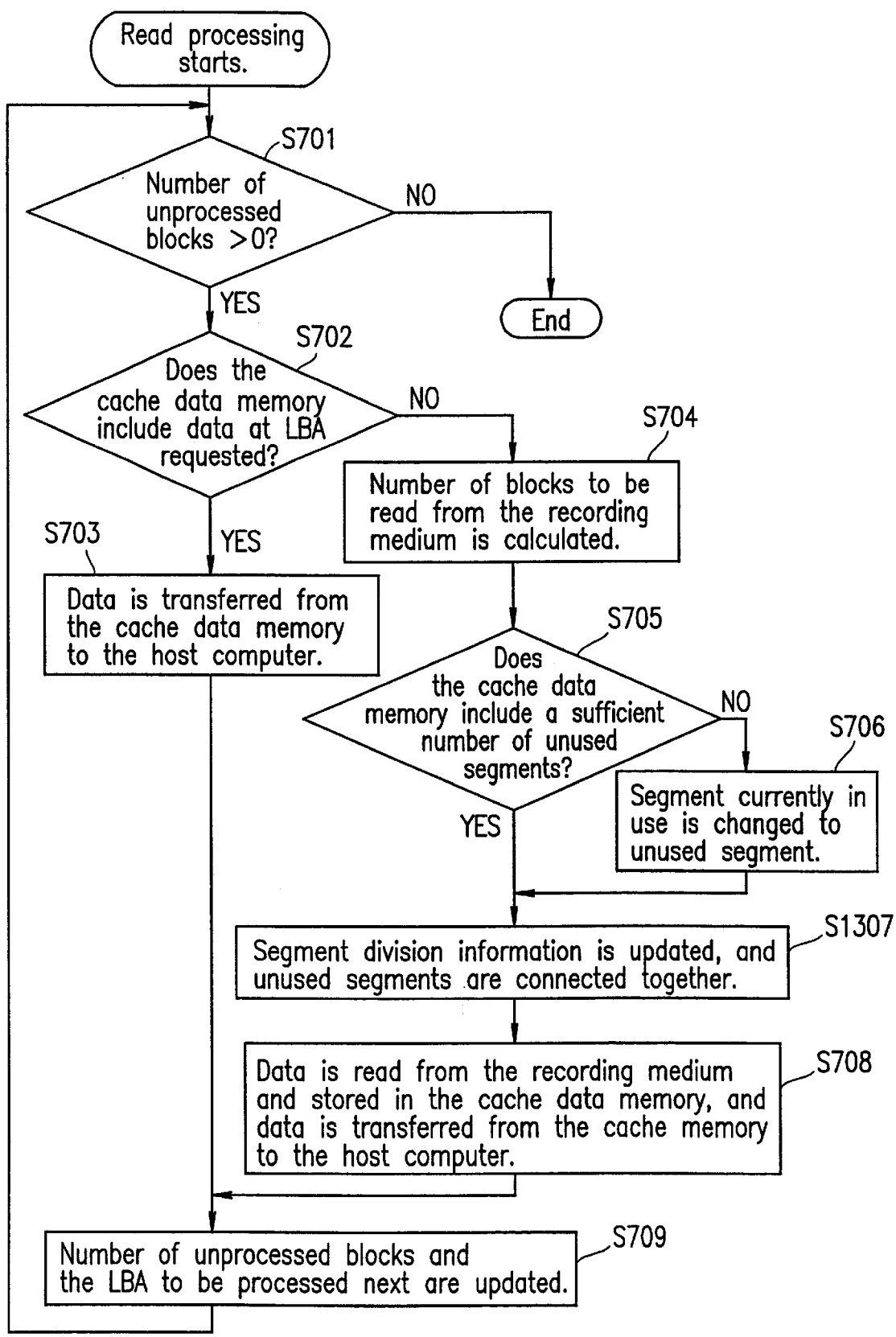
FIG. 13 is a flowchart illustrating read processing performed by the information recording and reproduction apparatus shown in FIG. 11 according to the second example.

FIG. 13 is a flowchart illustrating read processing performed by the information recording and reproduction apparatus 1100 when a data read operation is requested by the host computer 108 (FIG. 11). The read processing shown in FIG. 13 includes step S1307 instead of S707 in the read processing shown in FIG. 7. Since the processing in the other steps are the same as that in the processing shown in FIG. 7, only the processing performed in step S1307 will be described.

In step S1307, an unused segment, which will have an empty portion when the data in the number of blocks to be read which is calculated in step S704 is stored, is divided into a filled portion filled with data and an empty portion. For example, when 32 blocks of data are stored in an unused segment which can store 80 blocks of data, the unused segment is divided into a segment which can store 32 blocks of data and a segment which can store 48 blocks of data. The division is performed by updating the segment division information 1201 in the segment division information memory 1104. Then, the segment connection information in the segment connection information memory 104 is updated to connect unused segments. Then, the processing advances to step S708.

Figure 14:
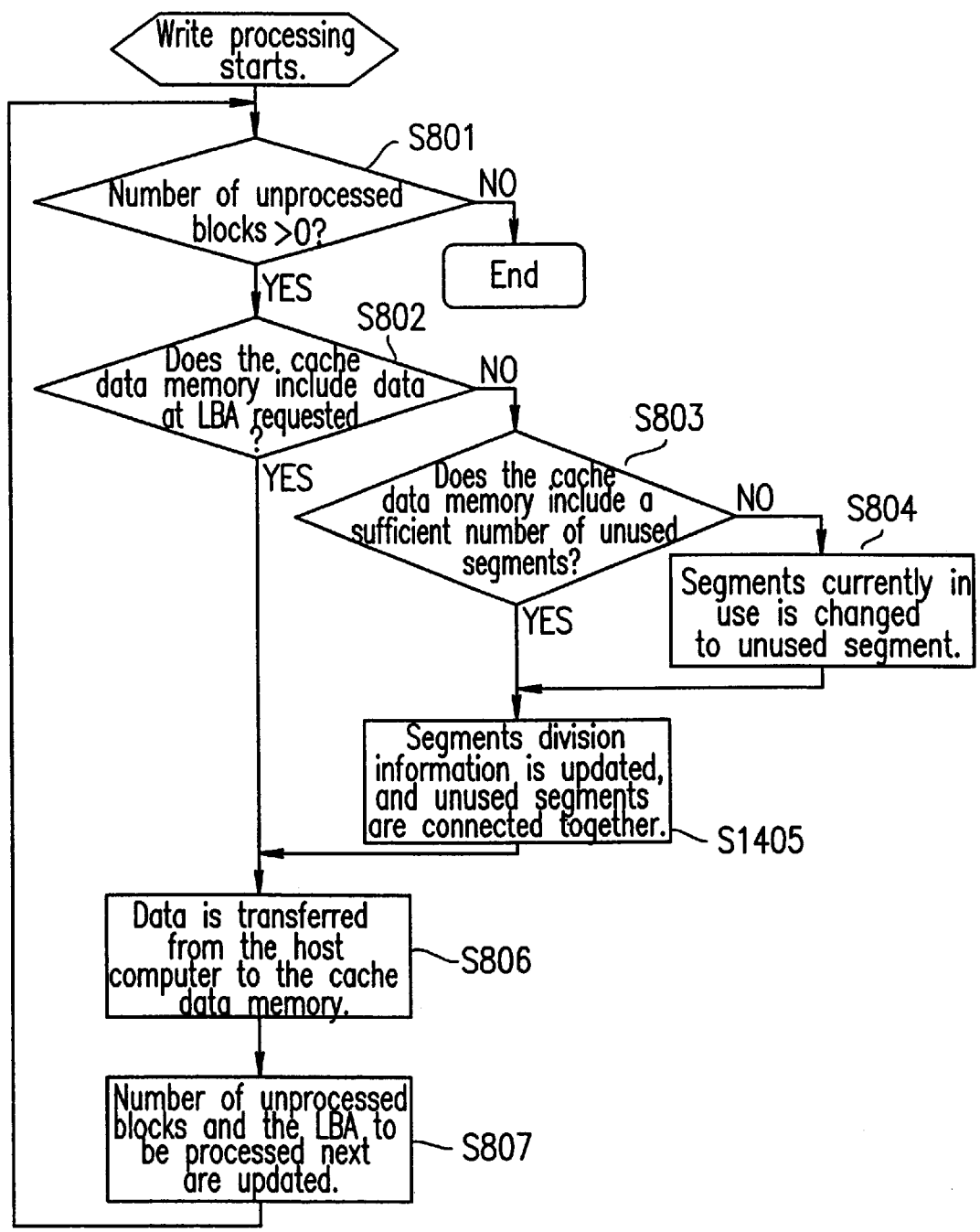
FIG. 14 is a flowchart illustrating write processing performed by the information recording and reproduction apparatus shown in FIG. 11 according to the second example.

FIG. 14 is a flowchart illustrating write processing performed by the information recording and reproduction apparatus 1100 when a data write operation is requested by the host computer 108 (FIG. 11). The write processing shown in FIG. 14 includes step S1405 instead of S805 in the write processing shown in FIG. 8. Since the processing in the other steps are the same as that in the processing shown in FIG. 8, only the processing performed in step S1405 will be described.

In step S1405, an unused segment, which will have an empty portion when the data transferred from the host computer 108 is stored, is divided into a filled portion filled with data and an empty portion. The division is performed by updating the segment division information 1201 in the segment division information memory 1104. Then, the segment connection information in the segment connection information memory 104 is updated to connect unused segments. Then, the processing advances to step S806.

Figure 15:
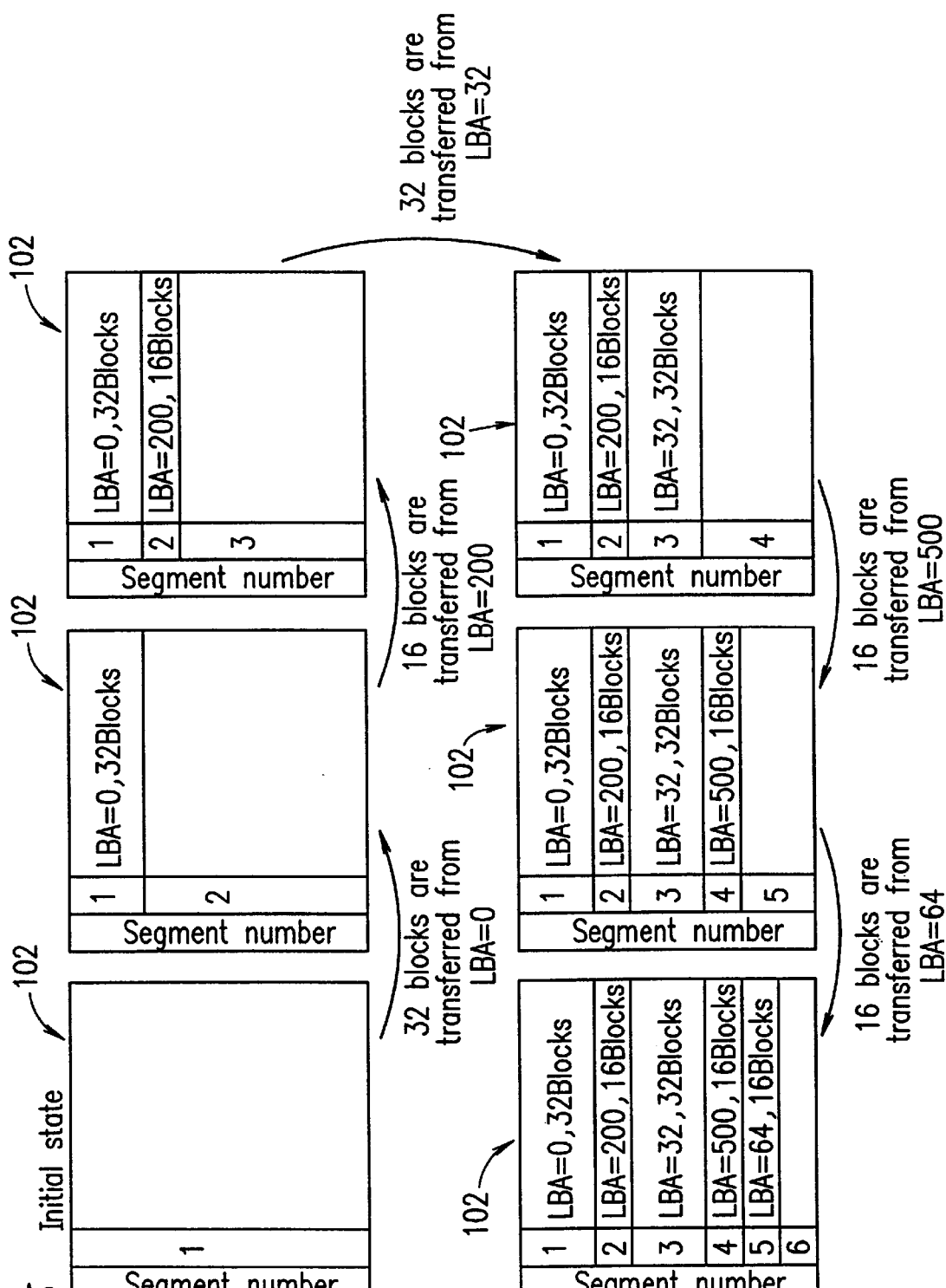
FIG. 15 is a diagram illustrating an example of data storage in a cache data memory performed during write processing of the information recording and reproduction apparatus shown in FIG. 11 according to the second example.

With reference to FIG. 15, a practical example of the write processing performed by the information recording and reproduction apparatus 1100 according to the second example will be described. In this example, data is stored in the cache data memory 102 when a data write operation is requested from the host computer 108.

It is assumed that in the initial state, the entire cache data memory 102 is one unused segment (segment 1). When five write requests (32 blocks of data from LBA=0, 16 blocks of data from LBA=200, 32 blocks of data from LBA=32, 16 blocks of data from LBA=500, and 16 blocks of data from LBA=64) are received from the host computer 108, the segment division information in the segment division information memory 1104 and the data in the segments in the cache data memory 102 change as shown in FIG. 15.

When a request for a data write operation of 32 blocks of data from LBA=0 is transferred from the host computer 108, segment 1 is divided into segment 1 and segment 2. The 32 blocks of data from LBA=0 are stored in segment 1. When a request for a data write operation of 16 blocks of data from LBA=200 is transferred from the host computer 108, segment 2 is divided into segment 2 and segment 3. The 16 blocks of data from LBA=200 are stored in segment 2.

When a request for a data write operation of 32 blocks of data from LBA=32 is transferred from the host computer 108, segment 3 is divided into segment 3 and segment 4. The 32 blocks of data from LBA=32 are stored in segment 3. When a request for a data write operation of 16 blocks of data from LBA=500 is transferred from the host computer 108, segment 4 is divided into segment 4 and segment 5. The 32 blocks of data from LBA=500 are stored in segment 4. When a request for a data write operation of 16 blocks of data from LBA=64 is transferred from the host computer 108, segment 5 is divided into segment 5 and segment 6. The 16 blocks of data from LBA=64 are stored in segment 5.

As shown in FIG. 16, the segment connection information in the segment connection information memory 104 is updated so that segment 1, segment 3 and segment 5 are connected together. The recording and reproduction controller 105 sequentially writes 80 blocks of data from LBA=0 into the recording medium 107. In other words, the recording and reproduction controller 105 sequentially writes the 32 blocks of data from LBA=0 which are stored in segment 1, the 32 blocks of data from LBA=32 which are stored in segment 3, and the 16 blocks of data from LBA=64 which are stored in segment 5 into the recording medium 107.

The recording and reproduction controller 105 also writes the 16 blocks of data from LBA=200 which are stored in segment 2 and the 16 blocks of data from LBA=500 which are stored in segment 4 into the recording medium 107.

As described above, in the second example, data transferred from the host computer 108 with one data write request can be managed as one segment, which provides an advantage of simplifying the processing of updating the segment connection information.

In the second example, the cache data memory 102, the cache management information memory 103, the segment connection information memory 104 and the segment division information memory 1104 are separate memories. However, the present invention is not limited to this. At least two of the cache data memory 102, the cache management information memory 103, the segment connection information memory 104 and the segment division information memory 1104 can be structured as one memory.

EXAMPLE 3

Figures 17, 18:
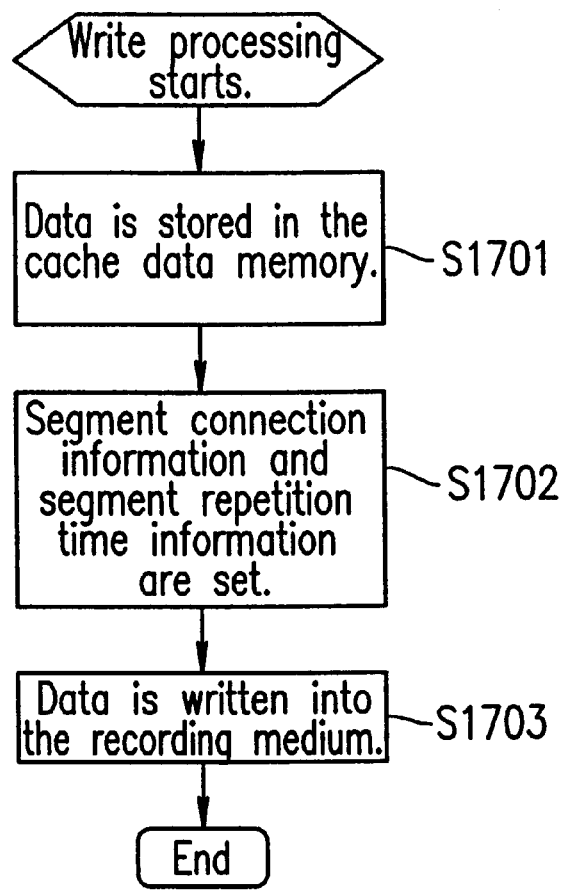
FIG. 17 is a flowchart illustrating write processing performed by the information recording and reproduction apparatus shown in FIG. 1 according to a third example of the present invention.
FIG. 18 is a diagram illustrating an exemplary data structure to be written in a recording medium according to the third example.

FIG. 17 is a flowchart illustrating write processing performed by an information recording and reproduction apparatus according to a third example of the present invention. The information recording and reproduction apparatus according to the third example has an identical structure with that of the information recording and reproduction apparatus 100 shown in FIG. 1 according to the first example. In the third example, the write processing is performed using segment repetition time information representing a number of times the data is to be written in repetition, unlike the first example. Identical elements previously discussed with respect to FIG. 1 bear identical reference numerals and the descriptions thereof will be omitted.

With reference to FIG. 17, write processing in the third example will be described.

In step S1701, data described below with reference to FIG. 18 is stored in the cache data memory 102. In step S1702, segment connection information is set in the segment connection information memory 104, and segment repetition time information is set in the segment connection information memory 104. In step S1703, based on the segment connection information set in the segment connection information memory 104 and the segment repetition time information set in the segment connection information memory 104, the data in the cache data memory 102 is written into the recording medium 107.

FIG. 18 shows an example of data to be written into the recording medium 107 in the third example. In FIG. 18, data in five blocks labeled "A" is identical, and data in three blocks labeled "B" is identical.

Figure 19:
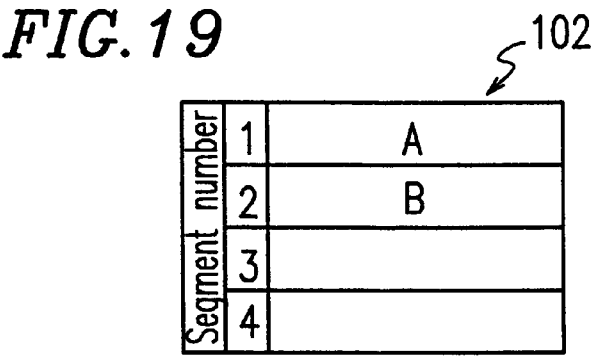
FIG. 19 is an exemplary structure of the cache data memory shown in FIG. 1 during write processing according to the third example.

FIG. 19 shows an exemplary structure of the cache data memory 102. As shown in FIG. 19, the data in one block labeled "A" and the data in one block labeled "B" are stored in the cache data memory 102.

Figure 20:
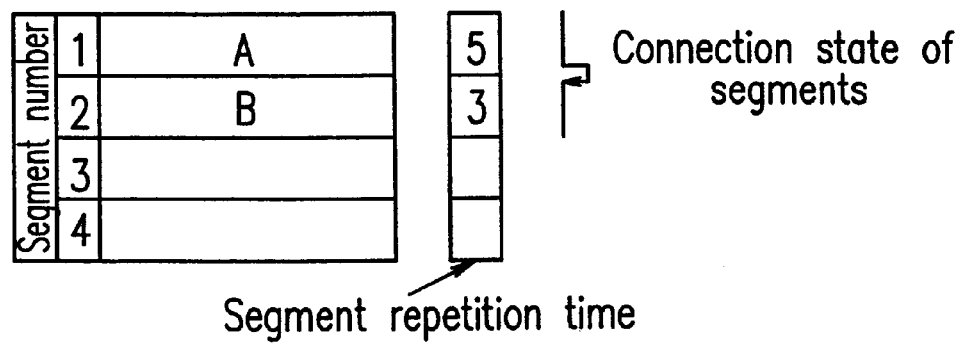
FIG. 20 is a diagram illustrating an example of segment connection performed during write processing of the information recording and reproduction apparatus shown in FIG. 1 according to the third example.
Figure 21:
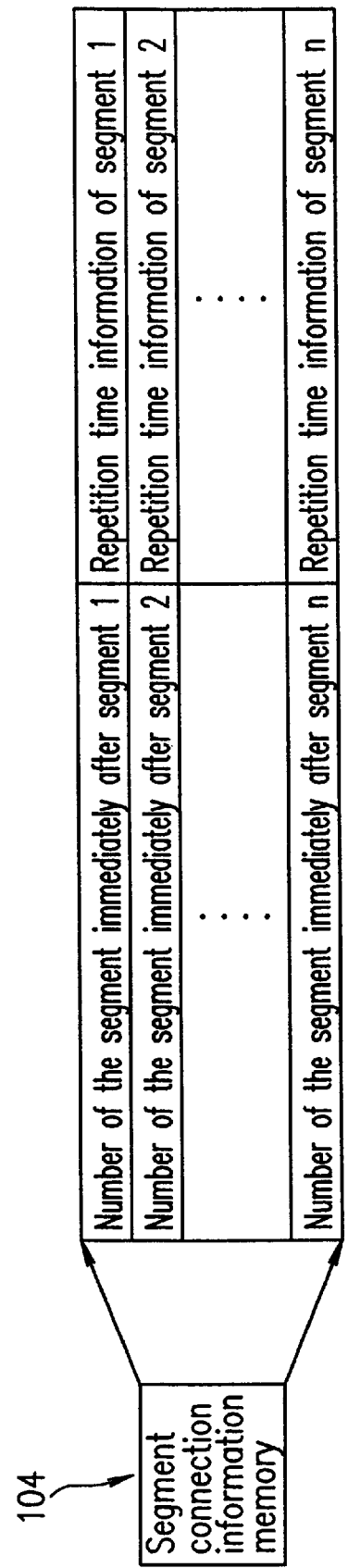
FIG. 21 is a diagram illustrating an exemplary structure of the segment connection information memory shown in FIG. 1 according to the third example when a unidirectional list is included.
Figure 22:
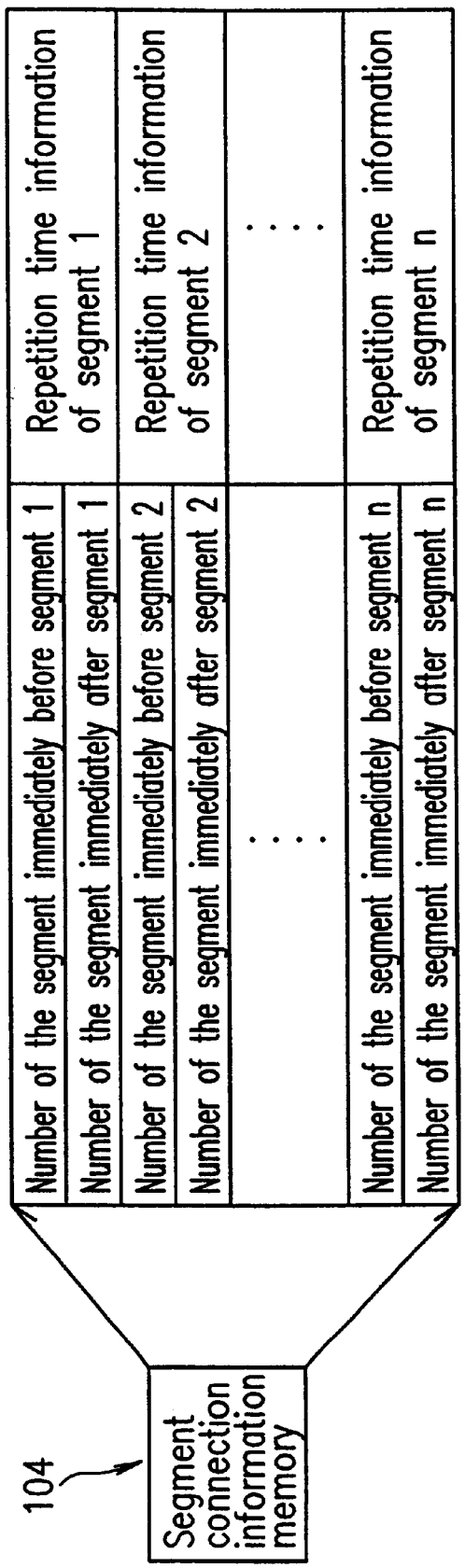
FIG. 22 is a diagram illustrating an exemplary structure of the segment connection information memory shown in FIG. 1 according to the third example when a bidirectional list is included.

FIG. 20 shows an exemplary segment connection state for write processing. As shown in FIG. 20, the segment repetition time of segment 1 is set to be 5 and the segment repetition time of segment 2 is set to be 3. The segment repetition time of each of segment 1 through segment n can be set in the segment connection information memory 104 as shown in FIGS. 21 and 22. FIG. 21 illustrates an exemplary structure of the segment connection information memory 104 when including a unidirectional list. FIG. 22 illustrates an exemplary structure of the segment connection information memory 104 when including a bidirectional list. The segment connection state is set so that segment 1 is immediately followed by segment 2. The segment repetition time information can be stored in the cache management information memory 103 instead of the segment connection information memory 104.

When the above setting operation is completed, a data write operation into the recording medium 107 is started. Based on the segment repetition time information and the segment connection information set in the segment connection information memory 104, data in segment 1 (data in the block labeled "A", FIG. 18) is written 5 times in repetition, and then data in segment 2 (data in the block labeled "B") is written 3 times in repetition.

As described above, in the third example, it is not necessary to store a plurality of pieces of identical data in the cache data memory 102. Therefore, the cache data memory 102 can be efficiently utilized to a maximum level.

As described above, according to the present invention, a cache data memory is divided into a plurality of segments and the connection state of the segments is dynamically changed. Therefore, an information recording and reproduction apparatus for utilizing the cache memory to a maximum level regardless of an access pattern from a host computer can be provided.

Various other modifications will be apparent to and can be readily made by those skilled in the art without departing from the scope and spirit of this invention. Accordingly, it is not intended that the scope of the claims appended hereto be limited to the description as set forth herein, but rather that claims be broadly construed.

What is claimed is:

1. An information recording and reproduction apparatus, comprising:
   a data transfer controller for receiving data to be written from a host computer;
   a cache data memory divided into a plurality of segments for temporarily storing said data which has been received by the data transfer controller;
   a segment connection information memory for storing segment connection information representing a logical connection state of the plurality of segments;

a buffer memory controller for managing said data which is temporarily stored in the cache data memory; and a recording and reproduction controller for writing said data which is temporarily stored in the cache data memory into a recording medium, wherein the buffer memory controller changes a used segment among the plurality of segments into an unused segment based on an effective data flag which indicates that effective data is stored in the used segment, or a dirty flag which indicates that unwritten data, which has not been written into the recording medium, is stored in the used segment, so as to obtain a sufficient number of unused segments in order to process said data, and updates the segment connection information based on said segment change so as to change the logical connection state of the plurality of segments.

2. An information recording and reproduction apparatus according to claim 1, wherein the buffer memory controller updates the segment connection information so as to logically connect the unused segments.

3. An information recording and reproduction apparatus according to claim 1, wherein the buffer memory controller updates the segment connection information so as to logically connect the plurality of segments storing said data, where the data is from sequential logical block addresses.

4. An information recording and reproduction apparatus according to claim 3, wherein the recording and reproduction controller sequentially writes said data which is stored in the logically connected plurality of segments and is from sequential logical block addresses into the recording medium.

5. An information recording and reproduction apparatus according to claim 1, wherein the segment connection information memory stores the segment connection information as a unidirectional list.

6. An information recording and reproduction apparatus according to claim 1, wherein the segment connection information memory stores the segment connection information as a bidirectional list.

7. An information recording and reproduction apparatus according to claim 1, further comprising a cache management information memory for storing management information on said data which is temporarily stored in the cache data memory on a segment-by-segment basis of the plurality of segments.

8. An information recording and reproduction apparatus according to claim 7, wherein the management information includes:

the effective data flags which indicate that effective data is stored in a corresponding segment of the plurality of segments, and the dirty flags which indicate that unwritten data which has not been written into the recording medium is stored in a corresponding segment.

9. An information recording and reproduction apparatus according to claim 1, wherein at least two of the cache data memory, the segment connection information memory and the cache management information memory are structured as one memory.

10. An information recording and reproduction apparatus, comprising:

a date transfer controller for receiving a data read request transferred from a host computer;

a recording and reproduction controller for reading data to be read from the recording medium as requested by the host computer;

a cache data memory divided into a plurality of segments for temporarily storing said data which has been read by the recording and reproduction controller;

a segment connection information memory for storing segment connection information representing a logical connection state of the plurality of segments; and a buffer memory controller for managing, said data which is temporarily stored in the cache data memory, wherein:

the data transfer controller transfers said data which is temporarily stored in the cache data memory to the host computer, and the buffer memory controller changes a used segment among the plurality of segments into an unused segment based on an effective data flag which indicates that effective data is stored in the used segment, or a dirty flag which indicates that unwritten data, which has not been written into the recording medium, is stored in the used segment, so as to obtain a sufficient number of unused segments in order to process said data, and updates the segment connection information based on said segment change so as to change the logical connection state of the plurality of segments.

11. An information recording and reproduction apparatus according to claim 10, wherein the buffer memory controller updates the segment connection information so as to logically connect the unused segments.

12. An information recording and reproduction apparatus according to claim 10, wherein the segment connection information memory stores the segment connection information as a unidirectional list.

13. An information recording and reproduction apparatus according to claim 10, wherein the segment connection information memory stores the segment connection information as a bidirectional list.

14. An information recording and reproduction apparatus according to claim 10, further comprising a cache management information memory for storing management information on said data which is temporarily stored in the cache data memory on a segment-by-segment basis of the plurality of segments.

15. An information recording and reproduction apparatus according to claim 14, wherein the management information includes:

the effective data flags which indicate that effective data is stored in a corresponding segment of the plurality of segments, and the dirty flags which indicate that unwritten data which has not been written into the recording medium is stored in a corresponding segment.

16. An information recording and reproduction apparatus according to claim 10, wherein at least two of the cache data memory, the segment connection information memory and the cache management information memory are structured as one memory.

17. An informational recording and reproduction apparatus, comprising:

a data transfer controller for receiving data to be written from a host computer;

a cache data memory divided into a plurality of segments for temporarily storing said data which has been received by the data transfer controller;

a segment division information memory storing segment division information representing a division state of at least one of the plurality of segments;

a segment connection information memory for storing segment connection information representing a logical connection state of the plurality of segments;

a buffer memory controller for managing said data which is temporarily stored in the cache data memory; and a recording and reproduction controller for writing said data which is temporarily stored in the cache data memory into a recording medium.

wherein the buffer memory controller divides an unused segment among the plurality of segments into a first unused segment having a sufficient size to process said data and a second unused segment, and updates the segment division information and the segment connection information so as to change the division state of the at least one of the plurality of segments and the logical connection state of the plurality of segments, respectively.

18. An information recording and reproduction apparatus according to claim 17, wherein the buffer memory controller updates the segment connection information so as to logically connect the plurality of segments storing said data, where the data is from sequential logical block addresses.

19. An information recording and reproduction apparatus according to claim 18, wherein the recording and reproduction controller sequentially writes said data which is stored in the logically connected plurality of segments and is from sequential logical block addresses into the recording medium.

20. An information recording and reproduction apparatus according to claim 17, wherein the segment connection information memory stores the segment connection information as a unidirectional list.

21. An information recording and reproduction apparatus according to claim 17, wherein the segment connection information memory stores the segment connection information as a bidirectional list.

22. An information recording and reproduction apparatus according to claim 17, wherein comprising a cache management information memory for storing management information on said data which is temporarily stored in the cache data memory on a segment-by-segment basis of the plurality of segments.

23. An information recording and reproduction apparatus according to claim 22, wherein the management information includes:

an effective data flag which is set when effective data is stored in a segment of the plurality of segments, and a dirty flag which is set when unwritten data which has not been written into the recording medium is stored in the segment.

24. An information recording and reproduction apparatus according to claim 17, wherein at least two of the cache data memory, the segment division information memory, the segment connection information memory and the cache management information memory are structured as one memory.

25. An information recording and reproduction apparatus, comprising:

a data transfer controller for receiving a data read request transferred from a host computer;

a recording and reproduction controller for reading data to be read from the recording medium as requested by the host computer;

a cache data memory divided into a plurality of segments for temporarily storing said data which has been read by the recording and reproduction controller;

a segment division information memory storing segment division information representing a division state of at least one of the plurality of segments;

a segment connection information memory for storing segment connection information representing a logical connection state of the plurality of segments; and a buffer memory controller for managing said data which is temporarily stored in the cache data memory, wherein:

the data transfer controller transfers said data which is temporarily stored in the cache data memory to the host computer, and the buffer memory controller divides an unused segment among the plurality of segments into a first unused segment having a sufficient size to process said data and a second unused segment, and updates the segment division information and the segment connection information so as to change the division state of the at least one of the plurality of segments and the logical connection state of the plurality of segments, respectively.

26. An information recording and reproduction apparatus according to claim 25, wherein the segment connection information memory stores the segment connection information as a unidirectional list.

27. An information recording and reproduction apparatus according to claim 25, wherein the segment connection information memory stores the segment connection information as a bidirectional list.

28. An information recording and reproduction apparatus according to claim 25, further comprising a cache management information memory for storing management information on said data which is temporarily stored in the cache data memory on a segment-by-segment basis of the plurality of segments.

29. An information recording and reproduction apparatus according to claim 30, wherein the management information includes:

an effective data flag which is set when effective data is stored in a segment of the plurality of segments, and a dirty flag which is set when unwritten data which has not been written into the recording medium is stored in the segment.

30. An information recording and reproduction apparatus according to claim 25, wherein at least two of the cache data memory, the segment division information memory, the segment connection information memory and the cache management information memory are structured as one memory.

31. An information recording and reproduction apparatus, comprising:

a data transfer controller for receiving data to be written from a host computer;

a cache data memory divided into a plurality of segments for temporarily storing said data which has been received by the data transfer controller;

a segment connection information memory for storing segment connection information representing a logical connection state of the plurality of segments;

a buffer memory controller for managing said data which is temporarily stored in the cache data memory; and a recording and reproduction controller for recording the data to be written temporarily stored in the cache data memory into a recording medium.

wherein:

the buffer memory controller updates the segment connection information so as to change the logical connection state of the plurality of segments, the data to be written includes at least a first data which is repeated a prescribed number of times within said data, and the recording and reproduction controller writes said data which is temporarily stored in the cache data memory into the recording medium based on repetition time information representing the prescribed number of times and the segment connection information.

32. An information recording and reproduction apparatus according to claim 31, wherein the repetition time information is stored in the segment connection information memory.

33. An information recording and reproduction apparatus according to claim 31, wherein the cache data memory stores the first data.

* * * * *

UNITED STATES PATENT AND TRADEMARK OFFICE
CERTIFICATE OF CORRECTION

PATENT NO. : 6,532,513 B1
DATED : March 11, 2003
INVENTOR(S) : Yamamoto et al.

It is certified that error appears in the above-identified patent and that said Letters Patent is hereby corrected as shown below:

<u>Column 16, lines 58-67 through Column 17, lines 1-17,</u>
Claim 17, should read:
17. An information recording and reproduction apparatus, comprising:

a data transfer controller for receiving data to be written from a host computer;

a cache data memory divided into a plurality of segments for temporarily storing said data which has been received by the data transfer controller;

a segment division information memory storing segment division information representing a division state of at least one of the plurality of segments;

a segment connection information memory for storing segment connection information representing a logical connection state of the plurality of segments;

a buffer memory controller for managing said data which is temporarily stored in the cache data memory; and a recording and reproduction controller for writing said data which is temporarily stored in the cache data memory into a recording medium, wherein the buffer memory controller divides an unused segment among the plurality of segments into a first unused segment having a sufficient size to process said data and a second unused segment, and updates the segment division information and the segment connection information so as to change the division state of the at least one of the plurality of segments and the logical connection state of the plurality of segments, respectively.

UNITED STATES PATENT AND TRADEMARK OFFICE
CERTIFICATE OF CORRECTION

PATENT NO. : 6,532,513 B1
DATED : March 11, 2003
INVENTOR(S) : Yamamoto et al.

It is certified that error appears in the above-identified patent and that said Letters Patent is hereby corrected as shown below:

<u>Column 18,</u>
Lines 33-41, claim 29 should read:
29.     An information recording and reproduction apparatus according to claim 28, wherein the management information includes:

an effective data flag which is set when effective data is stored in a segment of the plurality of segments, and a dirty flag which is set when unwritten data which has not been written into the recording medium is stored in the segment.

Signed and Sealed this

Ninth Day of September, 2003

JAMES E. ROGAN
*Director of the United States Patent and Trademark Office*